(12) United States Patent
Klabunde et al.

(10) Patent No.: US 6,562,403 B2
(45) Date of Patent: May 13, 2003

(54) SYNTHESIS OF SUBSTANTIALLY MONODISPERSED COLLOIDS

(75) Inventors: Kenneth J. Klabunde, Manhattan, KS (US); Savka Stoeva, Manhattan, KS (US); Christopher Sorensen, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 09/977,838

(22) Filed: Oct. 15, 2001

(65) Prior Publication Data

US 2003/0072874 A1 Apr. 17, 2003

(51) Int. Cl.$^7$ .............................. B05D 7/14; B01F 3/12
(52) U.S. Cl. ........................................ 427/216; 516/33
(58) Field of Search ..................... 427/216; 424/9.364, 424/9.365; 252/62.55; 516/33

(56) References Cited

U.S. PATENT DOCUMENTS

| 4,313,734 A | * | 2/1982 | Leuvering |
| 5,384,073 A | * | 1/1995 | Shigekawa et al. ..... 427/216 X |
| 5,514,602 A | * | 5/1996 | Brooks, Jr. et al. ..... 427/216 X |
| 5,583,056 A | * | 12/1996 | Brouwer ..................... 436/525 |
| 5,814,370 A | * | 9/1998 | Martino et al. ......... 427/216 X |
| 6,099,897 A | * | 8/2000 | Sayo et al. .............. 427/216 X |
| 6,150,181 A | * | 11/2000 | Halbreich et al. ...... 427/216 X |
| 6,262,129 B1 | * | 7/2001 | Murray et al. ................. 516/33 |

* cited by examiner

Primary Examiner—Richard D. Lovering
(74) Attorney, Agent, or Firm—Hovey Williams LLP

(57) ABSTRACT

A method of forming ligated nanoparticles of the formula $Y(Z)_x$ where Y is a nanoparticle selected from the group consisting of elemental metals having atomic numbers ranging from 21–34, 39–52, 57–83 and 89–102, all inclusive, the halides, oxides and sulfides of such metals, and the alkali metal and alkaline earth metal halides, and Z represents ligand moieties such as the alkyl thiols. In the method, a first colloidal dispersion is formed made up of nanoparticles solvated in a molar excess of a first solvent (preferably a ketone such as acetone), a second solvent different than the first solvent (preferably an organic aryl solvent such as toluene) and a quantity of ligand moieties; the first solvent is then removed under vacuum and the ligand moieties ligate to the nanoparticles to give a second colloidal dispersion of the ligated nanoparticles solvated in the second solvent. If substantially monodispersed nanoparticles are desired, the second dispersion is subjected to a digestive ripening process. Upon drying, the ligated nanoparticles may form a three-dimensional superlattice structure.

32 Claims, 7 Drawing Sheets

SYNTHESIS OF SUBSTANTIALLY MONODISPERSED COLLOIDS

FEDERALLY SPONSORED RESEARCH OR DEVELOPMENT

This invention was made with government support under Grant No. NAG8- 1687 awarded by NASA. The government has certain rights in the invention.

BACKGROUND OF THE INVENTION

1. Field of the Invention

The present invention is concerned with methods of forming large quantities of ligated nanoparticles which can be deposited in two- and three-dimensional superlattices. Broadly speaking, the method involves initially forming a first colloidal dispersion made up of nanoparticles solvated in a molar excess of a first solvent, a second solvent different from the first solvent, and a quantity of ligand moieties. Thereupon, a substantial part of the first solvent is removed and the ligand moieties are caused to ligate to the nanoparticles to give a second colloidal dispersion. Preferably, the second dispersion is subjected to a heat and reflux digestive ripening process to give substantially monodispersed colloidal particles. The invention also pertains to the ligated nanoparticle colloidal dispersions and to the final products.

2. Description of the Prior Art

It is known that high surface area nanoparticles can be formed by a vaporization-co-condensation process sometimes referred to as the solvated metal atom dispersion (SMAD) method. The latter involves vaporization of a metal under vacuum and codeposition of the metal atoms with the vapors of a solvent on the walls of a reactor cooled to 77 K (liquid nitrogen temperature). After warm-up, nanoparticles are stabilized both sterically (by solvation) and electrostatically (by incorporation of negative charge). The SMAD technique was first disclosed in 1986 by Klabunde and co-workers, and is also described in U.S. Pat. No. 4,877,647. A major advantage of the SMAD process is that no biproducts of metal salt reduction are present, and pure metal colloids are formed. Additionally, the SMAD process lends itself to industrial-scale operations, as opposed to other competing processes such as the inverse micelle and reductive procedures for metal colloid preparation.

Organization of nanoparticles into two and three-dimensional structures (nanocrystalline superlattices, NCSs) leads to the formation of materials characterized by very different properties compared to those of the discrete species. The manifestation of novel and technologically attractive properties is due to the collective interactions of the particles, as well as to the finite number of atoms in each-crystalline core. Synthesis and characterization of such materials are interesting from both fundamental and industrial points of view. Regularly arranged nanosized particles find applications in the development of optical and electronic devices, and magnetic recording media, for example. Nanoparticles of gold and other noble metals have attracted significant attention not only because of ease of preparation, but also due to their potential application in nano and microelectronics. Heretofore the challenge has been to form a structure of a planar array of small metal islands separated by tunnel barriers for use in electronics. Gold nanoparticles are excellent candidates in this respect.

Numerous methods for synthesis of particles arranged in 2D- and 3D-NCSs have been reported in the literature. The most common procedures include reduction of a suitable metal salt in the presence of different stabilizing agents. In all methods, the most important requirement is the ability to produce monodispersed particles that can order over a long-range. Crystalline arrays of particles covered by organic molecules have become of great interest, especially since the improved synthesis of thiol-stabilized gold nanoparticles has been developed (Brust, et al., *J. Chem. Soc., Chem. Commun.*, 1994, 801–802). Their advantage is that they behave as simple chemical compounds in respect that they can be dissolved, precipitated, and redispersed without change in properties, much as molecular crystals can.

SUMMARY OF THE INVENTION

The present invention is broadly concerned with methods of forming ligated nanoparticle colloidal dispersions and recovered ligated nanoparticles which may be in superlattice form. In general, the method involves initially forming a first colloidal dispersion comprising nanoparticles solvated in a molar excess of a first solvent, a second solvent different than the first solvent, and a quantity of ligand moieties. Next, a substantial part of the first solvent is removed and the ligand moieties are caused to ligate to the nanoparticles to give a second colloidal dispersion comprising the ligated nanoparticles solvated in the second solvent. If desired, the ligated nanoparticles may then be recovered as a dry product which, depending upon the nature of the nanoparticles and ligands selected, may assume a superlattice configuration.

Preparation of the first colloidal dispersion is preferably accomplished by vaporizing the solid substance (e.g., metal or metal salt) and first solvent in a reactor to give vaporized atoms or molecules and depositing the vaporized atoms or molecules and first solvent onto a cold surface. Upon subsequent warming of this mixture, nanoparticles are formed by aggregation of the atoms or molecules, and these nanoparticles and first solvent are allowed to mix with a second solvent and ligand moieties. Thereupon, the first solvent is removed by vacuum, which substantially completely eliminates the first solvent and also, to a limited degree, some of the second solvent.

In a particularly preferred technique, the second colloidal dispersion is subjected to a digestive ripening process so that the variation in particle size of the ligated nanoparticles is reduced; this ripening process is advantageously carried out until the second colloid is essentially monodispersed. This ripening process is also important if a superlattice dry product is desired.

The nanoparticles useful in the invention are generally selected from the group consisting of the elemental metals having atomic numbers ranging from 21–34, 39–52, 57–83 and 89–102, all inclusive, the halides, oxides and sulfides of such metals, and the alkali metal and alkaline earth metal halides. Elemental gold and silver are particularly preferred, with elemental gold being the single most preferred nanoparticle material. The nanoparticles should have an average diameter of from about 2–50 nm, and more preferably from about 3–15 nm. Similarly, the nanoparticles should have a BET surface area of from about 15–500 $m^2/g$, and more preferably from about 50–300 $m^2/g$.

The first and second solvents should be selected so that the first solvent may be readily removed by vacuum distillation or other techniques from the initial colloid. In practice, the first solvent should have a boiling point at least about 25° C. (more preferably at least about 40° C.) below the boiling point of the second solvent. Of course, the first and second solvents must also have the ability to solvate the nanoparticles and ligated nanoparticles, respectively.

Although a wide variety of solvents may be employed, preferably the first solvent is a ketone, and especially a ketone selected from the group consisting of ketones of the formula

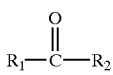

where $R_1$ and $R_2$ are independently and respectively selected from the group consisting of straight and branched chain C1–C5 alkyl and alkenyl groups, and the C1–C5 straight and branched chain alcohols. The single most preferred first solvent is acetone. The first solvent should be used at a level so that it is in molar excess relative to the nanoparticles, and preferably a molar excess of from about 50–1000 should be established.

The second solvent is preferably an aryl organic solvent such a toluene or xylene. More broadly, the solvent is advantageously selected from the group consisting of solvents of the formula

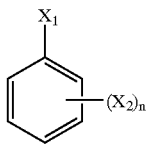

where $X_1$ and each $X_2$ are each independently and respectively selected from the group consisting of H and C1–C5 straight and branched chain alkyl and alkenyl groups, n is from 0 to 3, each $X_2$ may be independently located at any unoccupied ortho, meta or para position relative to $X_1$.

A variety of ligands may be used in the invention, and can be atoms, ions, or compounds. As used herein "ligand moieties" refers to all such ligand species. The preferred class of ligands are thiol compounds selected from the group consisting of compounds

where $R_3$ is a C5–C20 straight or branched chain alkyl or alkenyl group. More preferably, $R_3$ is a C10–C15 straight or branched alkyl or alkenyl group; an especially preferred ligand is dodecanethiol.

The digestive ripening process comprises the step of heating and refluxing the second colloidal dispersion, preferably at a temperature of from about 60–180° C. under an inert gas such as argon for a period of from about 10–400 minutes. The goal of digestive ripening is to reduce the particle size variation in the ligated nanoparticles; preferably, this process is carried out to achieve a ligated nanoparticle surface area of up to about 20% above and below the mean surface area of the ligated nanoparticles.

The final ligated nanoparticles in general have the formula $Y(Z)_x$ where Y is the nanoparticle and Z is the ligand; x is variable depending upon the nanoparticle and ligand selected. In the case of the preferred Au(dodecanethiol) ligated nanoparticles, x would typically A range from about 300–10,000, with a ligand density on the gold nanoparticle surface ranging from about 1–10 ligand moieties per square nanometer of nanoparticle surface area.

DETAILED DESCRIPTION OF THE PREFERRED EMBODIMENT

The following example sets forth presently preferred methods for the preparation of ligated nanoparticle superlattices in accordance with the invention. It is to be understood, however, that this Example is provided by way of illustration and nothing therein should be taken as a limitation upon the overall scope of the invention.

Figure 1:
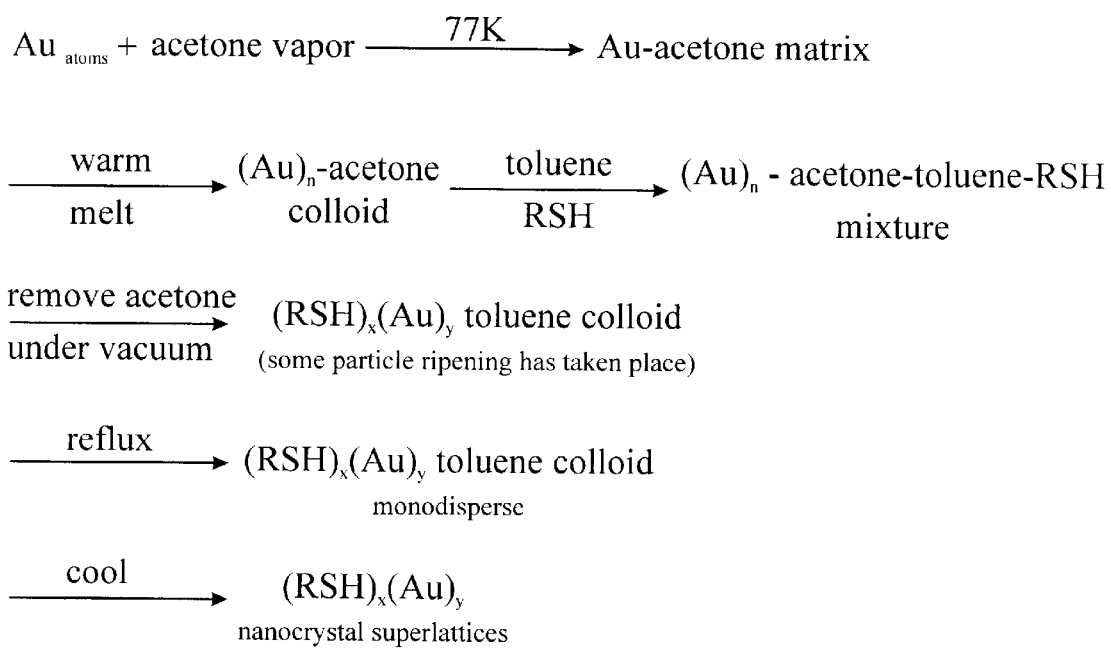
FIG. 1 is a flow diagram illustrating the synthetic steps in a preferred method for the preparation of nanocrystal superlattice products.

FIG. 1 is a flow diagram of the most preferred preparation of gold-containing nanocrystalline superlattice products. This method is also explained in detail below.

EXAMPLE

A) Preparation of Au-acetone-toluene-thiol Colloid (colloid 1)

A stationary reactor described in Klabunde, et al., *Inorg. Syn.*, Shriver, D., ed., 19, (1979), 59–86 was used for the synthesis of Au-acetone-toluene-thiol colloid. Acetone and toluene solvents were purchased from Fisher. Acetone was dried over molecular sieve. Both acetone and toluene were degassed five times by the standard freeze-thaw procedure prior to the reaction. Dodecanthiol was purchased from Aldrich and used as received. All glassware was rigorously cleaned before use.

A W—$Al_2O_3$ crucible was assembled in the SMAD reactor and the whole system was pumped down. This was followed by a step-wise heating of the crucible and the pressure was allowed to reach $4 \times 10^{-3}$ Torr at each heating step. The crucible was heated to red in about half an hour, then the heating was decreased and the whole reactor was left under vacuum overnight while the crucible was gently heated. This process ensured no contamination of the crucible. After the overnight treatment, the reactor was filled with air and the crucible was charged with ~0.3 g Au metal. At the same time 8 ml (6.8 g, $3.4 \times 10^{-2}$ mol) of dodecanethiol was placed in the bottom of the reactor chamber together with a stirring bar. Degassed acetone and toluene solvents were placed in Schlenk tubes and attached to the SMAD reactor. The whole system was evacuated and a liquid nitrogen filled Dewar placed around the vessel. Dodecanethiol was frozen in this way in the bottom of the reactor. When the vacuum reached $4 \times 10^{-3}$ Torr, 40 ml of toluene was evaporated in 15 min and frozen on the walls of the reactor. The liquid nitrogen Dewar was removed and toluene allowed to melt undisturbed and fall to the bottom of the reactor. The liquid nitrogen Dewar was again put in place, and Au vapor (0.27 g, $1.4 \times 10^{-3}$ mol) and acetone (100 ml) were codeposited over a period of 3 hours. During this time, the pressure was maintained at about $4 \times 10^{-3}$ Torr. The frozen matrix had a deep red color at the end of the deposition. After the process was complete the liquid nitrogen Dewar was removed and the matrix allowed to warm slowly over a period of ~1 hour. During the warmup process argon gas was allowed to fill the reactor system. Upon melting the Au-acetone matrix mixed with the toluene and the color became deep brown. When the dodecanethiol started to melt, stirring was started and the whole solution was agitated for another 45 min. The as-prepared dark brown Au-acetone-toluene-thiol colloid (colloid 1) was syphoned under argon into a Schienk tube.

B) Preparation of Au-toluene-thliol Colloid (colloid 2)

The Schlenk tube containing the as-prepared Au-acetone-toluene-thiol colloid (colloid 1) was connected to a vacuum line and the acetone was evaporated until a constant $1 \times 10^{-2}$ Torr pressure was reached (the more volatile acetone was removed along with some of the toluene). At this time the Au-toluene-thiol colloid was diluted to 80 ml by addition of degassed toluene. Thus the total volume of the final dark brown Au-toluene-thiol colloid was 80 ml containing about 0.20 g of gold.

C) Digestive Ripening

The digestive ripening process is an important step for formation of a monodispersed colloid from the polydisperse Au-toluene-thiol colloid (colloid 2). The procedure involved heating under reflux of a certain amount of Au-toluene-thiol colloid for 1.5 hours. The heating temperature is the boiling point of the colloidal solution (~120° C.). The digestive ripening was carried out under an argon atmosphere.

D) Isolation of a Dry Product

Isolation of a dry product was done after the gold-toluene-thiol colloid (colloid 2) was subjected to digestive ripening for 1.5 h. After cooling down to room temperature, 10 ml of the digested colloid (containing 0.025 g Au) was precipitated with 50 ml of absolute ethanol. After overnight treatment, the precipitation was complete and the supernatant was carefully removed by sucking out with a Pasteur pipette. The remaining precipitate together with a small amount of leftover toluene, thiol and ethanol was dried under vacuum until constant pressure ($5 \times 10^{-3}$ Torr). After drying, the color of the product was brown-red and it had the appearance of a wet paste. An additional 3 ml of ethanol was added and the system was left undisturbed overnight. The supernatant was then removed and the sediment again was dried under vacuum at constant pressure. After drying the precipitate (0.0214 g) was a powder with small shiny-dark crystals. It was washed again with 3 ml of ethanol, left overnight, the supernatant removed and dried under vacuum. After drying, the precipitate was 0.0207 g and no change of the mass was recorded after additional washing with ethanol and drying under vacuum. The yield was 84% based on gold. If the adsorbed thiol is taken into account, the yield was ~73%.

The final dry product was in the form of soft, shiny dark crystals, which are readily soluble in toluene or hexane. After addition of the solvent, the crystals immediately dissolved giving wine-red colored colloidal solution. However, the crystals are not soluble in ethanol or acetone.

E) UV-VIS Spectroscopy

UV/VIS absorption spectra were obtained using a Fiber Optic CCD Array UV-VIS Spectrophotometer of Spectral Instruments, Inc.

F) Transmission Electron Microscopy (TEM)

TEM studies were performed on a PHILIPS CM100 operating at 100 kV. The TEM samples were prepared by placing a 3 µl drop from the colloidal solution onto a carbon coated formvar copper grid. The grids were allowed to dry in air for 1 hour and left undisturbed at ambient conditions.

Results and Discussion

Since the first report in 1986 (Lin, et al., *Langmuir*, 2, (1986), 259–260) of the synthesis of nonaqueous colloidal gold solutions by the SMAD method, considerable work has been carried out on the preparation and characterization of several non-aqueous metal nanoscale particles (Franklin, et al., *High-Energy Processes in Organometallic Chemistry*; Suslick, K. S., ed., ACS Symposium series, (1987), 246–259; Trivino, et al., *Langmuir*, 3, 6, (1987), 986–992). Colloidal solutions of gold in acetone have been one of the most intensively studied and well-understood systems. Acetone, as a polar solvent, solvates the metal atoms and clusters during the warmup stage. In this way steric stabilization is achieved and gold colloids are stable for months.

These earlier results were the motivation for choosing acetone as an initial solvent in the present example. Preliminary attempts to improve size-distribution of particles from pure acetone solutions using the digestive ripening procedure turned out unsuccessful, and it was discovered that an additional stabilizing agent like dodecanethiol was needed. However, when only acetone was used as the solvent, addition of dodecanethiol did not allow the formation of a stable colloid. For example, the precipitate formed after addition of dodecanethiol to Au-acetone colloids, when separated and dried under vacuum, was only partially redispersable in toluene. Digestive ripening of the partially redispersed Au-colloids led to the size improvement of only those particles that were redispersed. The particles that remained in the sediment did not change their shape and size during this procedure. Therefore, it was found that a combination of solvents such as acetone and toluene was needed during the SMAD reaction and subsequent cluster growth and ligation by the thiol. The role of acetone was found to be stabilization of the gold nanoparticles in a preliminary way.

The size and shape changes of nanoparticles in the different samples were investigated by TEM. Representative transmission electron micrographs of the gold colloids at each step of the preparative procedure of the monodispersed colloid are shown in the Figures. A flow diagram of the major synthetic steps is given in FIG. 1. The results from the separate preparative stages are discussed below.

Formation of Monodispersed Thiol-protected Au-colloid

A) Au-acetone-toluene-thiol Colloid (colloid 1)

Figure 2:
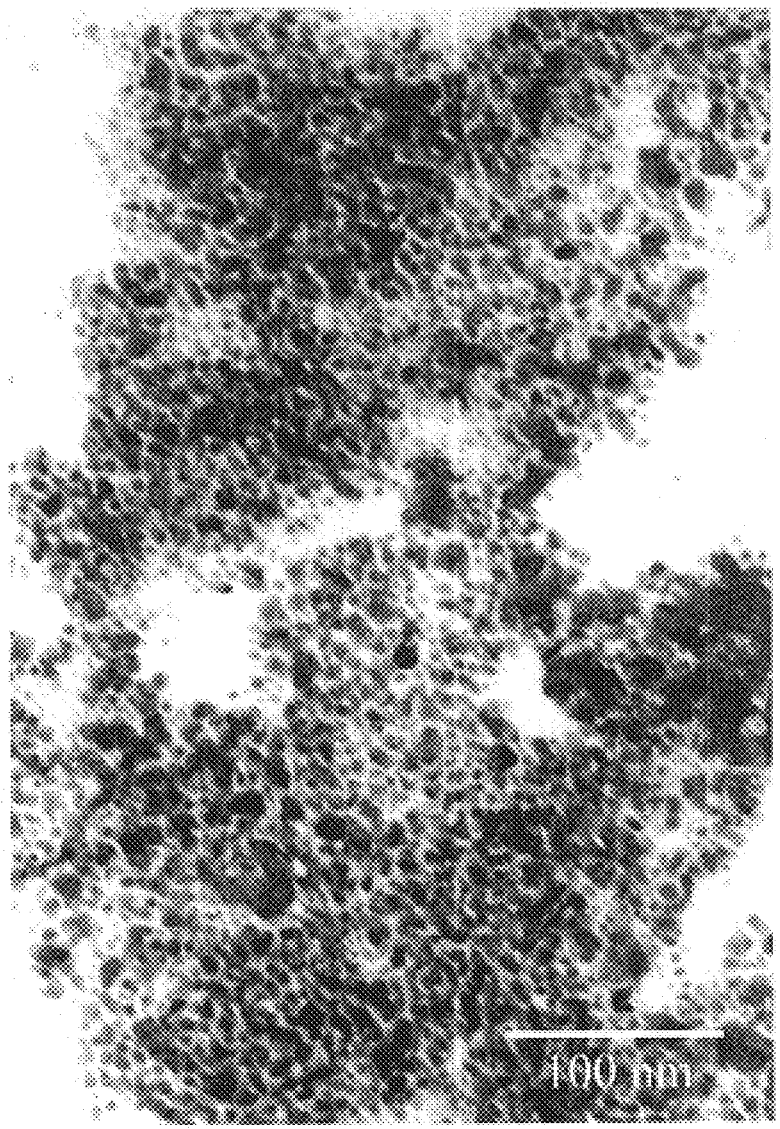
FIG. 2 is an TEM micrograph of gold particles in an Au-acetone-toluene-thiol colloid (colloid 1) described in the Example.

The initial Au-acetone-toluene-thiol colloid has a dark brown color. TEM studies of this colloid (FIG. 2) illustrate particles ranging from 5 to 40 nm with no definite geometrical shapes. These particles are very similar to the ones obtained in pure acetone solvent. As reported in the prior art, two types of stabilization are characteristic for these systems: 1) steric stabilization (by solvation with the acetone molecules) and 2) electrostatic stabilization (by acquiring electrons from the reaction vessel walls, electrodes, solvent medium). Another indication that the gold particles are negatively charged is the occasionally observed 'blinking' in the electron microscope due to the interaction of the particles with the negatively charged electron beam. However, it should be pointed out that in no case was change in the shape or morphology of the particles observed under the influence of the.electron beam. Both stabilization processes take place during the warmup step, should to be carried out slowly in order to ensure good stabilization.

B) Au-toluene-thiol Colloid (colloid 2)

Figure 3A:
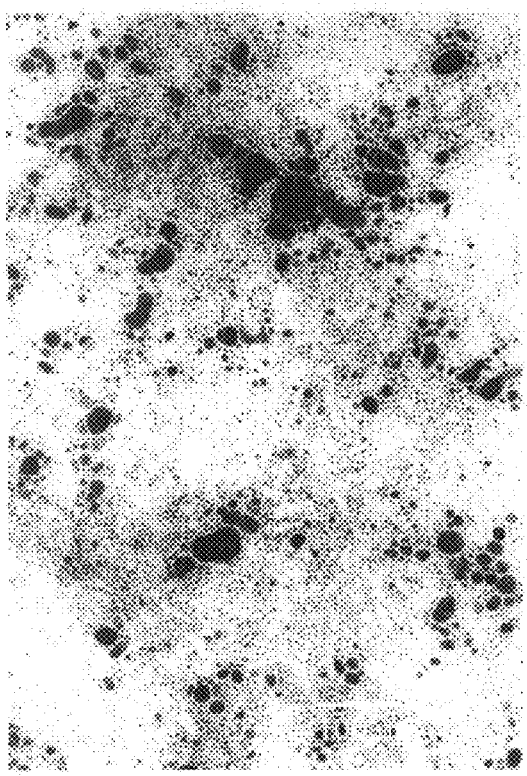
FIG. 3A is a TEM micrograph of gold particles in an Au-toluene-thiol colloid (colloid 2) described in the Example.
Figure 3B:
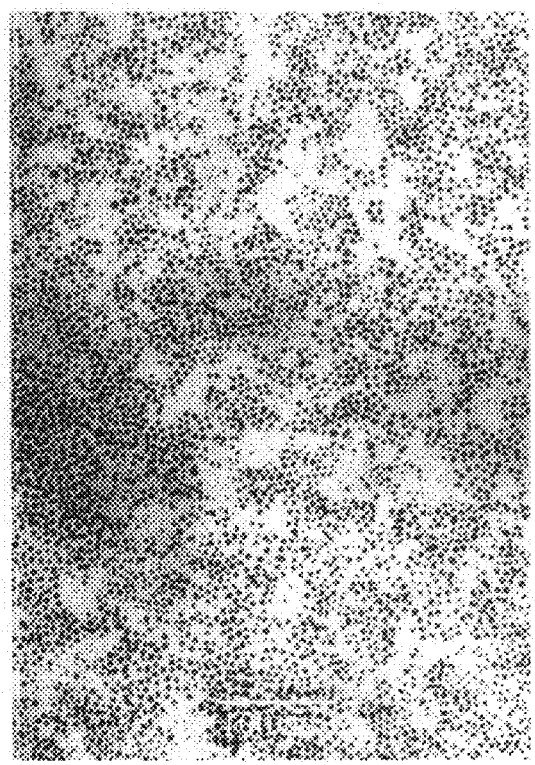
FIG. 3B is another TEM similar to that of FIG. 3A, but viewing another area of the TEM grid.

The Au-toluene-thiol colloid (colloid 2) was obtained by vacuum evaporation of all the acetone from colloid 1. TEM micrographs of two representative types of particles found in the colloid are shown in FIGS. 3A and 3B. Drastic change of the size and shape of the particles is characteristic at this stage. Nearly spherical particles with sizes in the range of 1 to 5 nm are dominant. There are also a small number of larger particles (10–40 nm) like those in the initial acetone-containing colloid.

Figure 4:
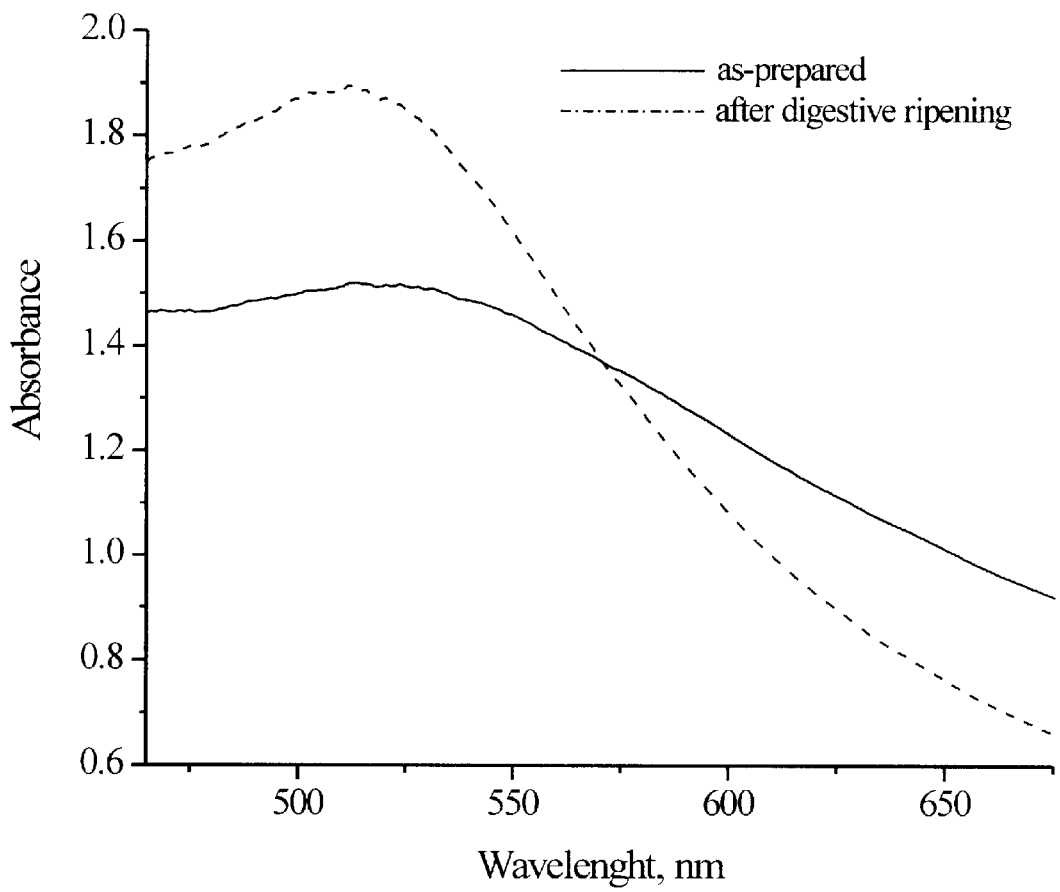
FIG. 4 is a graph depicting the UV/VIS absorption spectra of as-prepared colloid 2 (solid line) and the digestively ripened colloid (dotted line)

UV/VIS absorption spectrum (FIG. 4) of colloid 2 is in agreement with the sizes of the particles observed in TEM. It is characterized by a broad plasmon absorption band with no definite maximum.

One possible explanation for the change of size and shape of the gold particles induced by the removal of acetone is the following. In colloid 1 the amount of acetone is in great excess. It strongly solvates the gold particles and the attachment of dodecanethiol molecules on the particles' surface is suppressed. As acetone is removed from the system, the ability for thiol adsorption is increased. Thus acetone acts as a preliminary stabilizing agent, which is substituted by dodecanethiol molecules when acetone is evaporated. This ensures good dispersity of the thiol-ligated gold particles in the toluene medium. The fact that most of the particles in the Au-colloid after evaporation of acetone have size in the region of 1 to 5 nm sliggests that some ripening has already taken place, presumably due to the strong adsorption of dodecanethiol molecules on their surface. At this stage the colloid is ready for digestive ripening.

C) Digestive Ripeniing of Coloid 2 and Organization of the Gold Pparticles

Figure 5A:
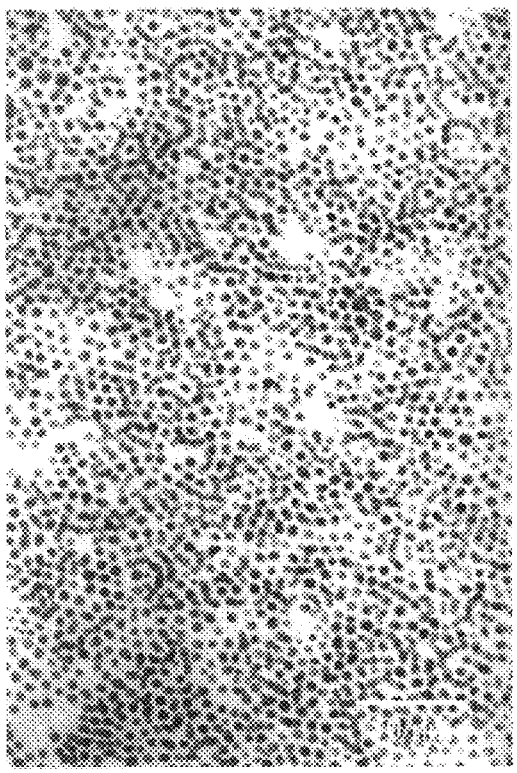
FIG. 5A is a TEM micrograph of gold particles after the digestive ripening step in the Example, where sampling was done from the hot colloidal dispersion.
Figure 5B:
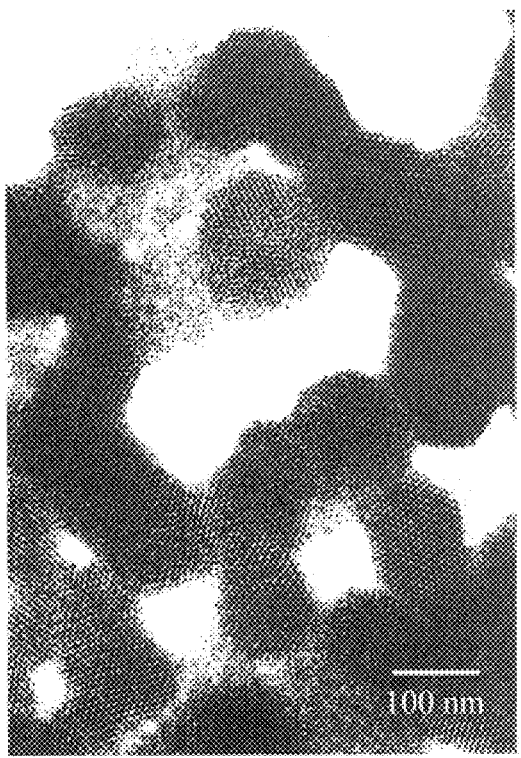
FIG. 5B is another TEM photograph similar to that of FIG. 5A.
Figure 6A:
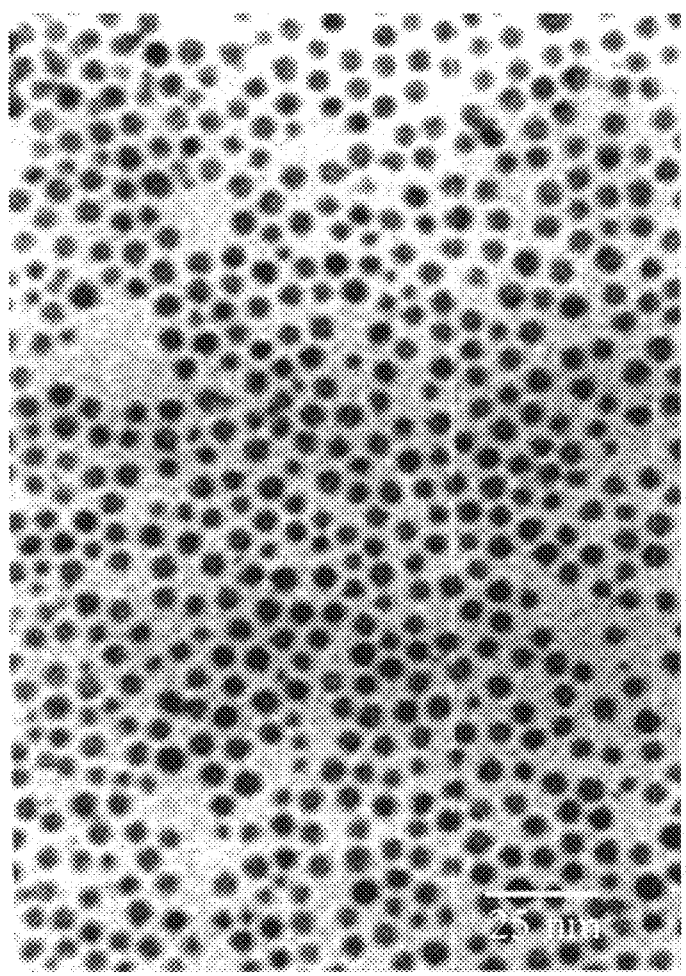
FIG. 6A is TEM micrograph of gold particles after the digestive ripening step of the Example (sampled from hot dispersion)
Figure 6B:
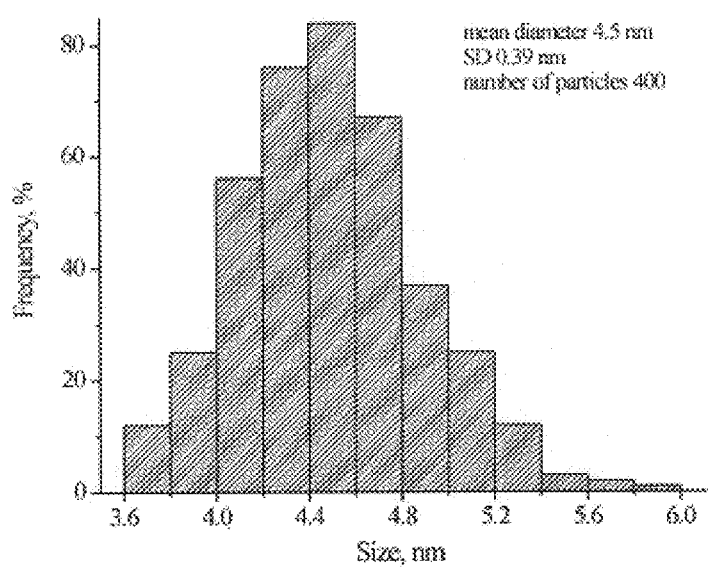
FIG. 6B is a histogram derived from the measurement of 400 particles which corresponds o the gold particle TEM micrograph of FIG. 6A.

Heating of colloid 2 under reflux results in a dramatic narrowing of the particle size-distribution. TEM studies (FIGS. 5A and 5B) of a hot colloidal solution show formation of spherically shaped particles with sizes of about 4 nm. They have a tendency to organize into 2D-layers. Some of the particles from the hot colloid organize in nice 3D-structures. The remarkable effect of the digestive ripening procedure is the great improvement of the size-distribution. Practically polydisperse colloid containing particles with sizes ranging from 1 to 40 nm are transformed into an almost monodispersed colloid with particles' sizes of about 4–4.5 nm. A photograph taken at higher magnification (FIG. 6) reveals that the shape of the particles is more polyhedral rather than spherical. The average size diameter is 4.5 nm and the size-distribution is log-normal as typical for colloidal systems. The UV/VIS absorption spectrum of the colloid after cooling to room temperature (FIG. 4) shows an appearance of a definite plasmon absorption maximum at 513 nm, which is in agreement with the size and monodispersity of the obtained particles.

Figure 7A:
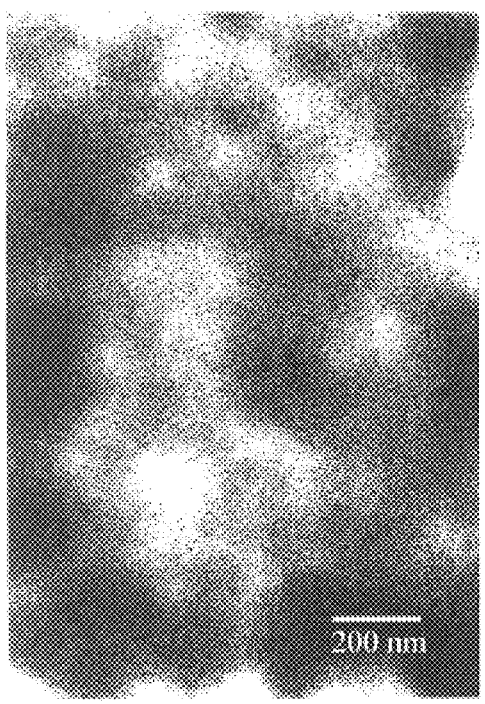
FIG. 7A is a TEM micrograph of gold particles 15 minutes after the completion of the digestive ripening process of the Example.
Figure 7B:
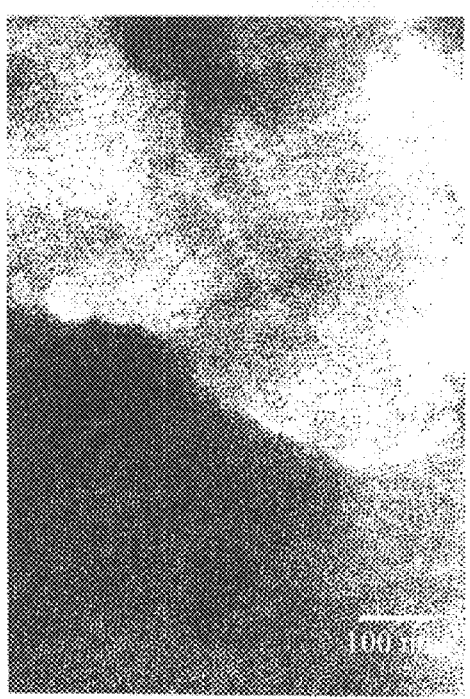
FIG. 7B is a TEM micrograph similar to that of 7A, but depicting the gold particles one ay after the completion of the digestive ripening process of the Example.
Figure 7C:
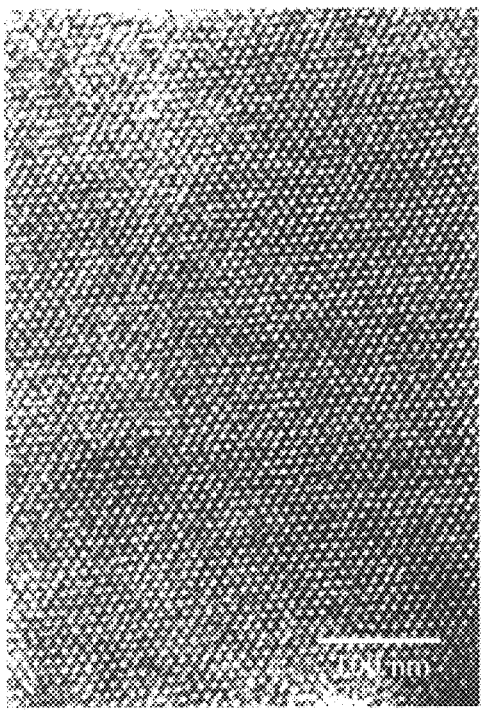
FIG. 7C is another TEM micrograph similar to that of 7B, and depicting the gold particles one day after the completion of the digestive ripening process of the Example.

The TEM micrographs of colloids cooled down for a different amount of time are shown in FIGS. 7A–7D. The amazing result is that the particles predominantly organize on the TEM grid in large 3D-structures in only about 15 min after the digestive ripening process is finished (FIG. 7A). A small number of areas of 2D-arrangement is also observed.

Figure 7D:
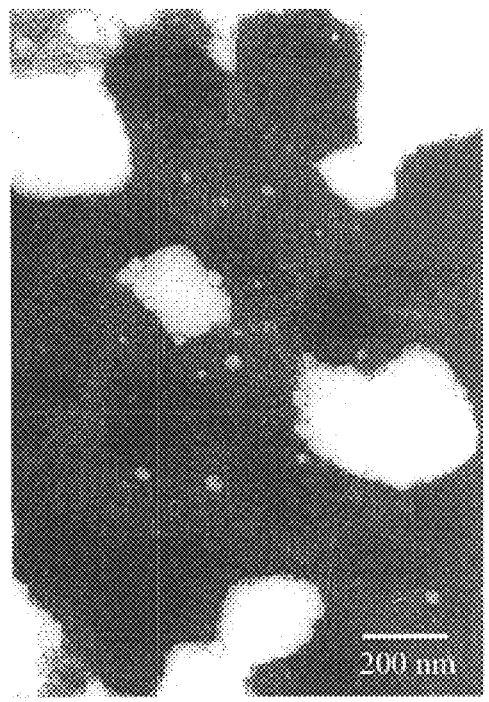
FIG. 7D is a TEM micrograph similar to that of 7A, but depicting the gold particles approximately two months after the completion of the digestive ripening process of the Example.

Even larger 3D-structures (>3 $\mu$m) are observed after 1 day (FIGS. 7B and 7C) and after ~2 months (FIG. 7D). The results suggest that the activation energy for 2D-organization is lower compared to this of 3D-organization.

We claim:

1. A method of forming ligated nanoparticles comprising the steps of:

forming a first colloidal dispersion comprising nanoparticles solvated in a molar excess of a first solvent, a second solvent different than the first solvent, and a quantity of ligand moieties, said colloidal nanoparticles selected from the group consisting of the elemental metals having atomic numbers ranging from 21–34, 39–52, 57–83 and 89–102, all inclusive, the halides, oxides and sulfides of such metals, and the alkali metal and alkaline earth metal halides;

removing a substantial part of said first solvent and causing said ligand moieties to ligate to said nanoparticles to give a second colloidal dispersion comprising the ligated nanoparticles solvated in said second solvent; and recovering said ligated nanoparticles.

2. The method of claim 1, said colloidal nanoparticle selected from the group consisting of elemental gold and silver.

3. The method of claim 1, said forming step comprising the steps of vaporizingsaid solid substance to givevaporizedatomsormoleculesand first solvent, depositing the vaporized atoms or molecules and first solvent onto a frozen quantity of the second solvent and ligand moieties, warming the second solvent and causing the deposited nanoparticles formed by aggregation of said atoms or molecules and first solvent to mix with the second solvent and ligand moieties.

4. The method of claim 1, said ligand moieties comprise a compound selected from the group consisting of compounds $$R_3SH$$

where $R_3$ is a C5–C20 straight or branched chain alkyl or alkenyl group.

5. The method of claim 1, said recovery step comprising the step of precipitating said ligated nanoparticles using a precipitation solvent.

6. The method of claim 1, said first solvent having a boiling point at least about 25° C. below the boiling point of the second solvent.

7. The method of claim 6, the first solvent having a boiling point at least about 40° C. below the boiling point of the second solvent.

8. The method of claim 1, wherein said first solvent is selected from the group consisting of ketones of the formula

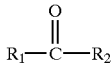

where $R_1$ and $R_2$ are independently and respectively selected from the group consisting of straight and branched chain C1–C5 alkyl and alkenyl groups, and the C1–C5 straight and branched chain alcohols.

9. The method of claim 8, said first solvent being acetone.

10. The method of claim 1, said second solvent being an aryl organic solvent.

11. The method of claim 10, said second solvent selected from the group consisting of solvents of the formula

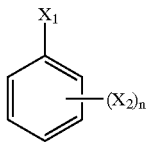

where $X_1$ and each $X_2$ are each independently and respectively selected from the group consisting of H and C1–C5 straight and branched chain alkyl and alkenyl groups, n is from 0 to 3, and each $X_2$ inay be independently located at any unoccupied ortho, meta or para position relative to $X_1$.

12. The method of claim 11, said second solvent being toluene.

13. The method of claim 1, including the step of digestively ripening said ligated nanoparticles prior to said recovery step in order to reduce the variation in particle size of said ligated nanoparticles.

14. The method of claim 13, said digestive ripening comprising the step of heating and refluxing said second colloidal dispersion.

15. The method of claim 14, said heating and refluxing step being carried out at a temperature of from about 60–180° C. for a period of from about 10–400 minutes.

16. The method of claim 14, said digestive ripening being carried out under an inert gas atmosphere.

17. The method of claim 14, said digestive ripening carried out to achieve a ligated nanoparticle size range about 20% above and below the mean particle size of said ligated nanoparticles.

18. A method of forming a ligated nanoparticle colloidal dispersion comprising the steps of:
  forming a first colloidal dispersion comprising nanoparticles solvated in a molar excess of a first solvent, a second solvent different than the first solvent, and a quantity of ligand moieties, said colloidal nanoparticles selected from the group consisting of the elemental metals having atomic numbers ranging from 21–34, 39–52, 57–83 and 89–102, all inclusive, the halides, oxides and sulfides of such metals, and the alkali metal and alkaline earth metal halides; and
  removing a substantial part of said first solvent and causing said ligand moieties to ligate to said nanoparticles to give a said ligated nanoparticle colloidal dispersion.

19. The method of claim 18, said colloidal nanoparticle selected from the group consisting of elemental gold and silver.

20. The method of claim 18, said forming step comprising the steps of vaporizing said solid substance to givc vaporized atoms or molecules and first solvcnt, depositing the vaporized atoms or molecules and first solvent onto a cold surface, warning the resulting mixture, and forming of the nanoparticles.

21. The method of claim 18, said ligand moieties comprise a compound selected from the group consisting of compounds

where $R_3$ is a C5–C20 straight or branded chain alkyl or alkenyl group.

22. The method of claim 18, said first solvent having a boiling point at least about 25° C. below the boiling point of the second solvent.

23. The method of claim 22, the first solvent having a boiling point at least about 40° C. below the boiling point of the second solvent.

24. The method of claim 23, wherein said first solvent is selected from the group consisting of ketones of the formula

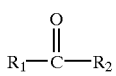

where $R_1$ and $R_2$ are independently and respectively selected from the group consistingof straight and branched chain C1–C5 alkyl and alkenyl groups, and the C1–C5 straight and branched chain alcohols.

25. The method of claim 24, said first solvent being acetone.

26. The method of claim 18, said second solvent being an aryl organic solvent.

27. The method of claim 26, said second solvent selected from the group consisting of solvents of the formula

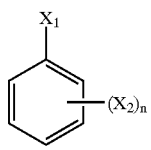

where $X_1$ and each $X_2$ are each independently and respectively selected from the group consisting of H and C1–C5 straight and branched chain alkyl and alkenyl groups, n is from 0 to 3, and each $X_2$ may be independently located at any unoccupied ortho, meta or para position relative to $X_1$.

28. The method of claim 27, said second solvent being toluene.

29. The method of claim 18, including the step of digestively ripening said second colloidal dispersion.

30. The method of claim 29, said digestive ripening being carried out under an inert gas atmosphere.

31. The method of claim 29, said digestive ripening comprising the step of heating and refluxing said second colloidal dispersion.

32. The method of claim 31, said heating and refluxing step being carried out at a temperature of from about 60–180° C. for a period of from about 10–400 minutes.

* * * * *